US008554788B2

(12) United States Patent
Jang et al.

(10) Patent No.: US 8,554,788 B2
(45) Date of Patent: Oct. 8, 2013

(54) APPARATUS AND METHOD FOR ANALYZING INFORMATION ABOUT FLOATING POPULATION

(75) Inventors: In-Sung Jang, Daejeon (KR); Jin-Hyoung Park, Cheongju-si (KR); Moon-Soo Lee, Daejeon (KR); Chung-Ho Lee, Daejeon (KR); In-Hak Joo, Daejeon (KR); Min-Soo Kim, Daejeon (KR); Ju-Wan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 211 days.

(21) Appl. No.: 13/042,968

(22) Filed: Mar. 8, 2011

(65) Prior Publication Data

US 2011/0225194 A1    Sep. 15, 2011

(30) Foreign Application Priority Data

Mar. 9, 2010  (KR) .................. 10-2010-0020704
Nov. 4, 2010  (KR) .................. 10-2010-0109318

(51) Int. Cl.
*G06F 17/30*  (2006.01)

(52) U.S. Cl.
USPC ........................................................ 707/776

(58) Field of Classification Search
USPC .................. 707/776, 736, E17.014
See application file for complete search history.

(56) References Cited

U.S. PATENT DOCUMENTS

2001/0043721 A1* 11/2001 Kravets et al. ................ 382/107
2006/0058953 A1* 3/2006 Cooper et al. ................ 701/208
2007/0005419 A1* 1/2007 Horvitz et al. ................ 705/14
2007/0262860 A1* 11/2007 Salinas et al. ............ 340/539.12

FOREIGN PATENT DOCUMENTS

KR    10-2008-0086051    9/2008

OTHER PUBLICATIONS

Mirco Nanni, Time-focused clustering of trajectories of moving objects, Nov. 2006, Journal of Intelligent Information Systems, vol. 27, Issue 3, pp. 267-289.*
Florian Verhein, Mining Spatio-temporal Association Rules, Sources, Sinks, Stationary Regions and Thoroughfares in Object Mobility Databases, 2006, Springer Berlin Heidelberg, Lecture Notes in Computer Science vol. 3882, pp. 187-201.*

* cited by examiner

*Primary Examiner* — Thu-Nguyet Le
(74) *Attorney, Agent, or Firm* — Staas & Halsey LLP

(57) ABSTRACT

Disclosed herein is an apparatus and method for analyzing information about floating population. The apparatus includes an information collection unit, a data integration unit, a data mining analysis unit, and an interface unit. The information collection unit collects information about locations provided by mobile communication terminals of moving objects, information about attributes of the moving objects, and information about locations and attributes related to stationary objects. The data integration unit creates integrated data by integrating the information collected by the information collection unit, national statistical information, and map data registered previously. The data mining analysis unit extracts data, consistent with conditions input by a system user, from the integrated data, and searches the map data for based moving patterns of the moving objects using data mining analysis. The interface unit provides a map service in which search results have been applied to the map data.

20 Claims, 9 Drawing Sheets

FIG. 5

| USER ID | INFORMATION ABOUT MOVEMENT (M-point) | AGE | GENDER | LEVEL OF LIVING | RESIDENCE |
|---|---|---|---|---|---|
| 1232321 | (x,y,time)-(x,y,time)-(x,y,time)- | 23 | Male | 2500 | GANGNAM-GU, SEOUL |

FIG. 6

| USER ID | DIGITAL ROAD NETWORK MAP-BASED ID (ROAD ID) | AGE | GENDER | LEVEL OF LIVING | RESIDENCE |
|---|---|---|---|---|---|
| 1232321 | (road id,time)-(road id,time)-..-(road id,time) | 23 | Male | 2500 | GANGNAM-GU, SEOUL |

FIG. 7

| USER ID | CENSUS OUTPUT AREA-BASED ID (LOCAL ID) | AGE | GENDER | LEVEL OF LIVING | RESIDENCE |
|---|---|---|---|---|---|
| 1232321 | (area id,time)-(area id,time)-..-(area id,time) | 23 | Male | 2500 | GANGNAM-GU, SEOUL |

FIG. 8

```
┌─────────────────────────────────────────────────────────────────────────┐
│ USER DEFINITION-SEARCH ATTRIBUTE SETTING                            [X] │
├─────────────────────────────────────────────────────────────────────────┤
│ □SUPPORT:        [  5  ]%                                               │
│ □PERIOD SETTING:[2010]YEAR[ 06 ]MONTH[ 21 ]DATE▣~[2010]YEAR[ 06 ]MONTH[ 21 ]DATE▣ │
│ □TIME SETTING: [00:00]~[24:00]                                          │
│ □AGE:           □ ALL □TEENAGERS ☑TWENTIES ☑THIRTIES □FORTIES □FIFTIES □ SIXTIES │
│                                                                              AND OLDER │
│ □GENDER:        ☑ ALL      □MALE □FEMALE                                │
│ □LEVEL OF LIVING: [ 1,000  ]~[ 100,000  ] (UNIT:WON)                    │
│ □ANALYSIS CYCLE: [ 15 ]MINUTES  ANALYSIS   [ 60 ]MINUTES  ANALYSIS  [AVG  ▽] │
│                                 INTERVAL:                 METHOD:       │
├─────────────────────────────────────────────────────────────────────────┤
│                                                   [CONFIRM]  [CANCEL]   │
└─────────────────────────────────────────────────────────────────────────┘
```

APPARATUS AND METHOD FOR ANALYZING INFORMATION ABOUT FLOATING POPULATION

CROSS REFERENCE TO RELATED APPLICATIONS

This application claims the benefit of Korean Patent Application No. 10-2010-0020704, filed on Mar. 9, 2010, and Korean Patent Application No. 10-2010-0109318, filed on Nov. 4, 2010, which are hereby incorporated by reference in their entirety into this application.

BACKGROUND OF THE INVENTION

1. Technical Field

The present invention relates generally to an apparatus and method for analyzing information about floating population, and, more particularly, to an apparatus and method for analyzing information about floating population, which can analyze information about the characteristics and tendencies of floating population based on data about the movement of moving objects using a data mining analysis technique and provide information about analysis results.

2. Description of the Related Art

Recently, as an approach to the methodology of supporting marketing and the inauguration of businesses including the analysis of local commercial areas, the analysis of local economies and the selection of the locations of businesses, there has been a tendency for methods and services for analyzing commercial areas using statistical analysis techniques to become popularized.

In general, the most important part of the analysis of commercial areas is the analysis of floating population, and therefore survey of floating population in the corresponding areas is taken by mean of field survey. However, field survey of floating population is subject to the problem of it being difficult to obtain accurate analysis result for floating population at all time intervals.

Furthermore, the analysis of commercial areas entails periodic survey and non-periodic survey in preparation for the occurrence of factors in the variation of floating population such as the opening of a new large-sized culture center or a distribution company and the construction of to a road. However, periodic survey and non-periodic survey have the problems of incurring high expenses and requiring the employment of reliable survey personnel.

Moreover, conventional analysis of commercial areas has been performed in connection with residential areas or stationary buildings, such as companies and shopping malls, so that it has a limit on pattern searches related to the analysis of the tendencies of floating populations in terms of age groups, the levels of living, and principal moving time intervals in corresponding areas.

SUMMARY OF THE INVENTION

Accordingly, the present invention has been made keeping in mind the above problems occurring in the prior art, and an object of the present invention is to provide an apparatus and method for analyzing information about floating population, which can collect and integrate information about the movements of the coordinates of mobile communication terminals over time and provide information about the characteristics and analysis of time-varying floating population on a digital map using a data mining analysis technique and a geographical information system (GIS).

Another object of the present invention is to provide an apparatus and method for analyzing information about floating population, which enables data mining analysis using frequent area searches and road-based sequential pattern searches for specific floating population based on the collected and integrated information about moving objects.

In order to accomplish the above objects, the present invention provides an apparatus for analyzing information about floating population, including an information collection unit for collecting information about locations provided by mobile communication terminal of each of moving objects, information about attributes of the moving objects registered in an external server, and information about locations and attributes related to stationary objects; a data integration unit for creating integrated data by integrating the information collected by the information collection unit, national statistical information of a geographic information system (GIS), and map data registered previously; a data mining analysis unit for extracting data, consistent with conditions input by a system user, from the integrated data, and searching the map data for moving patterns of the moving objects using data mining analysis; and an interface unit for providing a map service in which search results, provided by the data mining analysis unit, have been applied to the map data.

The data mining analysis unit may include a frequent pattern search module for searching areas, which belong to areas selected from the map data by the system user and each of which has the floating population equal to or larger than a reference value, for frequent patterns.

The frequent pattern search module may search for moving patterns each of which has a value equal to or greater than a predetermined percentage in respect of the conditions input by the system user.

The data mining analysis unit may indicate areas having the floating population larger than a predetermined threshold on the map data based on the frequent patterns searched out by the frequent pattern search module.

The data mining analysis unit may include a sequential pattern search module for searching for sequential patterns of specific paths which belong to paths of the moving objects occurring in a preset time interval and in preset time sections and which have occurred a number of times greater than a threshold value.

The sequential pattern search module may search for the sequential patterns from road Identifiers (IDs) included in information about movement of the mobile communication terminals of the moving objects.

The sequential pattern search module may search for the moving patterns by connecting locations of the road IDs, included in the information about movement of the mobile communication terminals of the moving objects, in time order when the moving objects move.

The data mining analysis unit may indicate time-varying moving patterns, occurring on roads, on the map data based on the sequential patterns searched out by the sequential pattern search module.

The information collection unit may collect at least one of information which is selected from among information about movement and attributes of the mobile communication terminals of the moving objects, information about ages, genders, residences, levels of living, use of membership cards, payment using credit cards and use of transportation cards of users of the mobile communication terminals, and national statistical information.

The information collection unit may periodically or non-periodically collect the information about locations provided by the mobile communication terminals of the moving objects.

The apparatus may further include a storage unit for storing the map data, the information collected by the information collection unit, and the integrated data created by integrating the map data with the information collected by the information collection unit.

In order to accomplish the above objects, the present invention provides a method of analyzing information about floating population, including collecting information about locations provided by mobile communication terminal of each of moving objects, information about attributes of the moving objects registered in an external server, and information about locations and attributes related to stationary objects; creating integrated data by integrating the information collected by the collecting, national statistical information of a GIS, and map data registered previously; extracting data, consistent with conditions input by a system user, from the integrated data, and searching the map data for moving patterns of the moving objects using data mining analysis; and providing a map service in which search results of the searching for the moving patterns have been applied to the map data.

The collecting may collect at least one of information which is selected from among information about movement and attributes of the mobile communication terminals of the moving objects, information about ages, genders, residences, levels of living, use of membership cards, payment using credit cards and use of transportation cards of users of the mobile communication terminals, and national statistical information.

The searching for the moving patterns may include searching areas, which belong to areas selected from the map data by the system user and each of which has the floating population equal to or larger than a reference value, for frequent patterns using a frequent pattern search module.

The searching for the frequent patterns may search for moving patterns each of which has a value equal to or greater than a predetermined percentage in respect of the conditions input by the system user.

The searching for the moving patterns may include indicating areas which have the floating population larger than predetermined threshold on the map data based on the frequent patterns searched out by the frequent pattern search module.

The searching for the moving patterns may include searching for sequential patterns of specific paths, which belong to paths of the moving objects occurring in a preset time interval and in preset time sections and which have occurred a number of times greater than a threshold value, using a sequential pattern search module.

The searching for the sequential patterns may search for the sequential patterns from road IDs included in information about movement of the mobile communication terminals of the moving objects.

The searching for the sequential patterns may search for the moving patterns by connecting locations of the road IDs, included in the information about movement of the mobile communication terminals of the moving objects, in time order when the moving objects move.

The searching for the moving patterns may include indicating time-varying moving patterns, occurring on roads, on the map data based on the sequential patterns searched out by the sequential pattern search module.

BRIEF DESCRIPTION OF THE DRAWINGS

The above and other objects, features and advantages of the present invention will be more clearly understood from the following detailed description taken in conjunction with the accompanying drawings, in which:

FIGS. 5 to 10 are diagrams showing examples of the operation of the apparatus for analyzing information about floating population according to the present invention.

DESCRIPTION OF THE PREFERRED EMBODIMENTS

Figure 1:
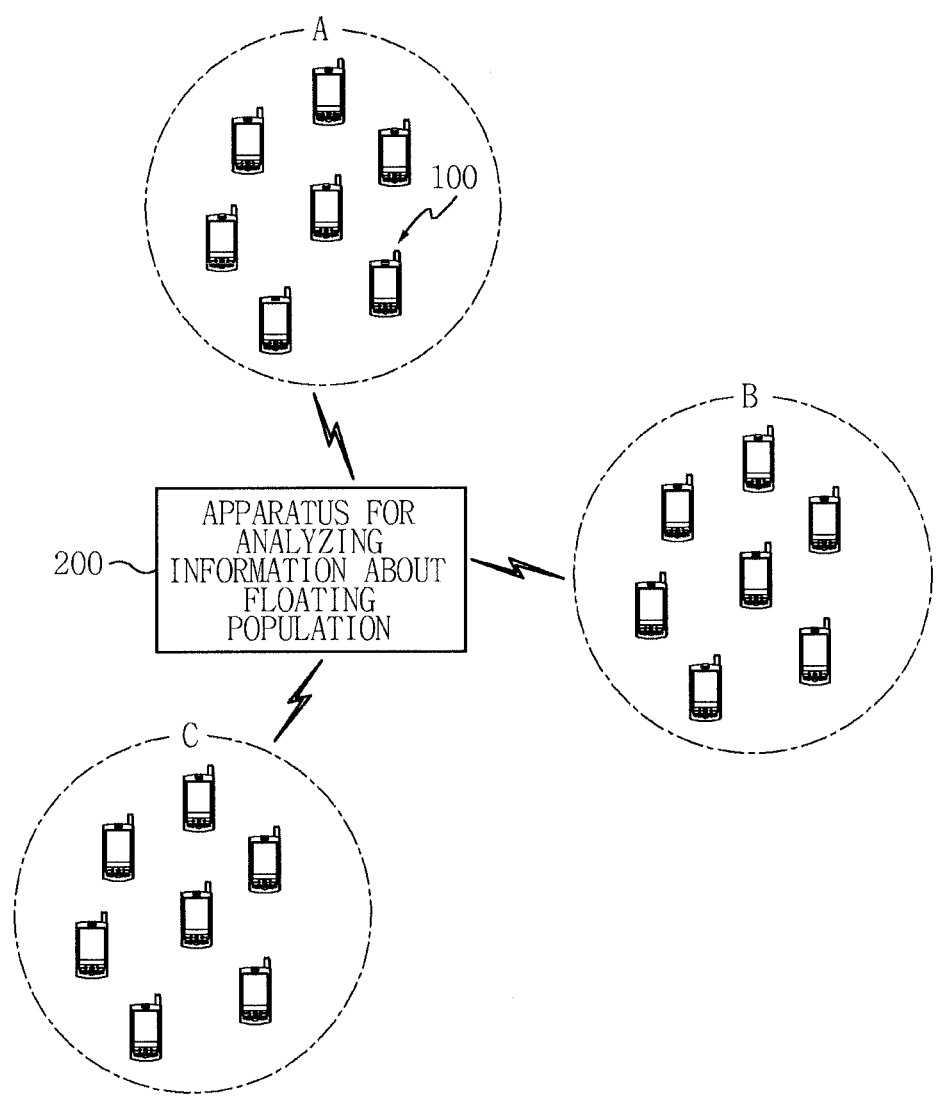
FIG. 1 is a diagram showing the configuration of a system to which an apparatus for analyzing information about floating population according to the present invention has been applied.

Reference now should be made to the drawings, in which the same reference numerals are used throughout the different drawings to designate the same or similar components.

Embodiments of the present invention will be described with reference to the accompanying drawings.

FIG. 1 is a diagram showing the configuration of a system to which an apparatus 200 for analyzing information about floating population according to the present invention has been applied.

As shown in FIG. 1, the apparatus 200 for analyzing information about floating population according to the present invention collects information about moving objects and information about stationary objects from various areas A, B and C, integrates and analyzes the collected information, and provides results to a system user.

Here, the term "moving objects" refers to humans who were registered as data providers whose data is used to collect information, and the term "stationary objects" refers to fixed objects, such as buildings, the locations of which are not changed.

The apparatus 200 for analyzing information about floating population collects information about locations from the mobile communication terminals 100 of the moving objects, and then processes and analyzes data about floating population using the collected information, information about the attributes of the moving objects, and national statistical information. Therefore, the apparatus 200 for analyzing information about floating population may provide information about the analysis of commercial areas to the system user.

Here, the information about moving objects includes information about the movement and attributes of the mobile communication terminals 100, information about payment using credit cards, information about the use of transportation cards, national statistical information, etc. which were collected from exchanges all over the nation via mobile communication networks. Additionally, the information about moving objects includes data about the ages, genders, residences and use of membership cards of the users of the mobile communication terminals 100.

Here, the information about the movement of the moving objects includes x and y coordinate values on a map and information about the times at which the locations of the moving objects were measured.

Furthermore, information about payments (for example, information about the locations of payments) related to affiliated card companies, information about the use of transportation cards (information about the locations of stops/stations at which payments were made), and information about the coordinate values and attributes of businesses having established commercial areas may be further included. The national statistical information includes information about official land prices, information about resident populations, and information about resident companies and enterprises.

A description of the detailed configuration of the apparatus 200 for analyzing information about floating population will now be given with reference to FIG. 2.

Figure 2:
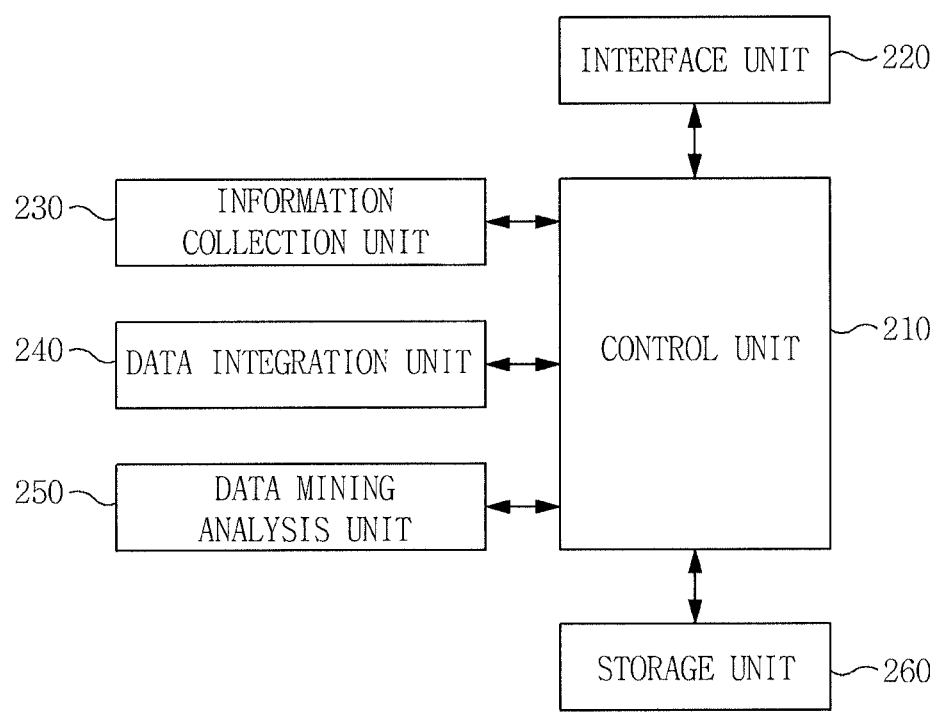
FIG. 2 is a block diagram illustrating the configuration of the apparatus for analyzing information about floating population according to the present invention.

FIG. 2 is a block diagram illustrating the configuration of the apparatus 200 for analyzing information about floating population according to the present invention.

As shown in FIG. 2, the apparatus 200 for analyzing information about floating population includes a control unit 210, an interface unit 220, an information collection unit 230, a data integration unit 240, a data mining analysis unit 250, and a storage unit 260.

The control unit 210 controls the operation of the components of the apparatus 200 for analyzing information about floating population.

The interface unit 220 provides a map service to the system user.

Here, the interface unit 220 receives the system user's request for information (related to commercial area analysis) on a digital map, indicates processing results on a map, and additionally indicates information using a graph and/or a diagram in highly readable and usable form.

The information collection unit 230 collects information about the locations and attributes of moving objects and stationary objects from data providers.

In this case, the information collection unit 230 may periodically or non-periodically collect information about the locations of the moving objects from corresponding mobile communication terminals on a daily basis.

Furthermore, the information collection unit 230 collects information about the details of the use of membership cards, credit cards and transportation cards related to the mobile communication terminals. Here, the information about the attributes of the moving objects and the information about the locations and attributes of the stationary objects may have been registered in an external server, and the information collection unit 230 may collect the information registered in the external server in advance and store it in the storage unit 260.

Here, the control unit 210 transfers the information, collected by the information collection unit 230, to the data integration unit 240.

The data integration unit 240 processes the information collected by the information collection unit 230, integrates the processed data with map data, and stores resulting data in the storage unit 260.

Here, the data integration unit 240 uses information about payment using membership cards and credit cards and information about the use of transportation cards in order to correct information about the movement of the moving objects, and includes road and area ID information, to which the coordinates of movement are subordinate, in the movement information by using the spatial information of the map data, thereby enabling it to be used for data mining analysis.

Furthermore, the data integration unit 240 integrates national statistical information with map data, thereby enabling it to be used for the location condition analysis of the data mining analysis unit 250.

As an example, since standard land-based official land price information is represented using x and y coordinate values and areas on a map are represented in the form of polygons, the data integration unit 240 integrates statistical information, such as standard land-based official land price information and information about resident populations, with area IDs using a spatial integration operation, and then stores results in the storage unit 260.

The data mining analysis unit 250 extracts useful information based on data stored in the storage unit 260 in response to a request from the system user, and returns the information to the system user.

In this case, the data mining analysis unit 250 collects data, included in an region queried by the system user, from the storage unit 260, searches for road-based sequential pattern and area-based (census output area or administrative district-based) frequent pattern of floating population, and indicates the pattern of movement of the floating population on a digital map.

A description of the detailed configuration of the data mining analysis unit 250 will now be given with reference to FIG. 3.

Meanwhile, the storage unit 260 stores the map data, and stores the information collected by the information collection unit 230. Furthermore, the storage unit 260 stores information obtained by integrating the map data with the information, collected by the information collection unit 230, using the data integration unit 240.

A description of the detailed configuration of the storage unit 260 will be given with reference to FIG. 4 later.

Figure 3:
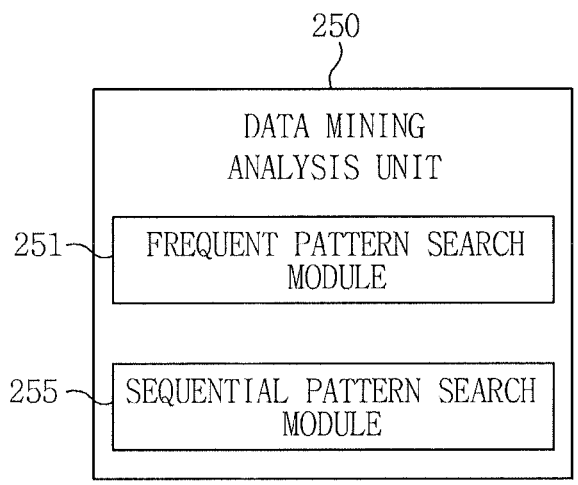
FIG. 3 is a block diagram illustrating the detail configuration of the data mining analysis unit according to the present invention.

FIG. 3 is a block diagram illustrating the detailed configuration of the data mining analysis unit 250 according to the present invention.

As shown in FIG. 3, the data mining analysis unit 250 includes an area-based frequent pattern search module 251 and a road-based sequential pattern search module 255.

First, the area-based frequent pattern search module 251 searches the areas of a system user-selected region, each having a relatively large floating population, for frequent patterns.

Here, the term "frequent patterns" refers to patterns which belong to the entire data and each of which has a value equal to or greater than a percentage input by the system user.

In this embodiment of the present invention, the entire time interval and time sections for animation are set in order to represent information about areas, each having a floating population greater than a threshold value (approval rating) set by the system user, on a time basis, and areas in which floating population is concentrated over time are indicated on a map.

Meanwhile, the road-based sequential pattern search module 255 searches for sequential patterns, that is, information about paths along which floating population relatively frequently move in limited areas, using road IDs and time information included in information about the movement of the moving objects.

Here, since information about the locations of each moving object includes the pieces of time information for the moving coordinates, the sequential pattern search module 255 can find the path of the moving object by sequentially connecting the pieces of location information in time order.

Here, the term "sequential pattern search" refers to a technique of searching the continuous path sections of all moving objects, having occurred in a predetermined time interval, for specific sections which have occurred a number of times greater than a threshold value set by the system user.

As an example, it is assumed that if the path of human A is represented as <a, b, c, d> when the human A moves from location a through locations b and c to location d on a map, human B moves along path <b, c, e> and human C moves along path <a, b, c, e, f>.

If a threshold value set for the three paths by the system user is 2, paths <b, c>, <a, b, c> and <b, c, e>, each of which has occurred two or more times, can be extracted. Here, the extracted partial paths are referred to as sequential patterns.

Since the locations of each object moving along a path do not actually have the same coordinate values and a building or a river, other than a road, may be present between locations b and c, the sequential pattern search module 255 according to the present invention searches for sequential patterns by sequentially connecting road IDs, rather than a plurality of pieces of information about the coordinates of the user of a corresponding mobile phone.

Furthermore, the sequential pattern search module 255 sets and limits information about the attributes of floating population, such as a gender, an age and the level of living, which will be used to search for sequential patterns, searches for sequential patterns at time intervals set by the system user, and indicates searched sequential patterns on a digital map.

Figure 4:
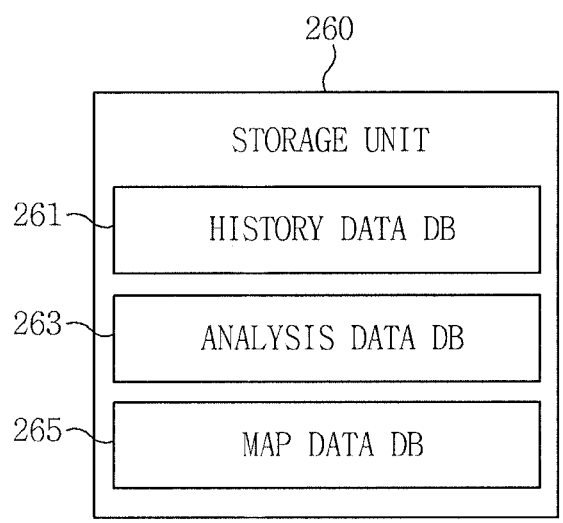
FIG. 4 is a block diagram illustrating the detailed configuration of a storage unit according to the present invention.

FIG. 4 is a block diagram illustrating the detailed configuration of the storage unit 260 according to the present invention.

As shown in FIG. 4, the storage unit 260 according to the present invention includes a history data DB 261, an analysis data DB 263, and a map data DB 265.

The map data DB 265 stores a web map, a digital map or the like using a geographic information system (GIS).

The history data DB 261 stores information collected by the information collection unit 230.

Here, the history data DB 261 stores information about the movement and attributes of the mobile communication terminals 100 (x and y coordinate values on a map, and information about the times at which the locations of the moving objects were measured) collected from exchanges all over the nation via mobile communication networks, information about payment using credit cards (information about the locations of payments, etc.), information about the use of transportation cards (information about the locations of stops/stations at which payments were made, etc.), national statistical information (information about official land prices, information about resident populations, information about resident companies and enterprises, etc.), information about the ages, genders and residences of the users of the mobile communication terminals 100, and data about the use of membership cards.

The analysis data DB 263 stores the information obtained by the integration of the data integration unit 240. That is, the analysis data DB 263 stores the information obtained by integrating the information stored in the history data DB 261 with the data stored in the map data DB 265.

FIGS. 5 to 10 are diagrams showing examples of the operation of the apparatus for analyzing information about floating population according to the present invention.

FIG. 5 is a diagram showing an example of the results obtained by integrating information about the locations and attributes of the users of mobile phones, collected from the data providers, using the data integration unit 240 according to an embodiment of the present invention.

As shown in FIG. 5, the data integration unit 240 integrates information about the users of the mobile phones, such as information about IDs, ages, genders and residences of the users, with information about the locations of the users. Furthermore, the data integration unit 240 adds information about the levels of living of the users.

Here, the attribute "level of living" refers to an attribute which represents whether each floating population can become potential customers and which is used to partially represent comparative purchasing power and the comparative level of living.

Accordingly, the data integration unit 240 applies the unit area-based average land prices of the residences of the users of the mobile phones based on the information about official land prices of the national statistical information.

Meanwhile, the data integration unit 240 uses the information about payment using membership cards and credit cards and the information about the use of transportation cards to correct the information about the movement of the users of the mobile phones, and includes information about roads and area IDs, to which moving coordinates are subordinate, in the information about movement using the spatial information of the map data DB 265, thereby enabling the information to be used for data mining analysis.

Here, FIG. 6 shows an example in which information about road IDs has been included in the information about movement, and FIG. 7 shows an example in which information about area IDs has been included in the information about movement.

As an example, the data integration unit 240 defines the moving pattern of the user A of a mobile communication terminal as "L1-L3" when the location of the mobile communication terminal of the user A changes from location L1 at time t1 to location L3 at time t3. If a payment is made using a credit card in a shop at location L2 and at time t2 (time t1<t2<t3), the data integration unit 240 updates the moving pattern of the user A to "L1-L2-L3," and includes information about road and area IDs, to which each location L1 is subordinate, in each piece of point information.

Furthermore, the data integration unit 240 integrates the national statistical information with the map data DB 265, thereby enabling it to be used for location condition analysis.

As an example, the data integration unit 240 integrates statistical information, such as information about standard land-based official land prices and information about resident populations, with area IDs using a spatial integration operation because the information about standard land-based official land prices is represented using x and y coordinate values and areas on a map are represented using polygons, and stores integration results in the analysis data DB 263.

FIG. 8 shows an embodiment in which system user-defined search attributes are set, particularly an example in which attributes used for frequent pattern searches are set.

As shown in FIG. 8, the data mining analysis unit 250 sets areas on a map in order to search for the area-based frequent patterns of floating population. Thereafter, the data mining analysis unit 250 sets a system user's threshold value, the entire time interval and time sections for animation, and attributes used to extract only necessary data from the entire floating population data.

Furthermore, the data mining analysis unit 250 extracts data corresponding to frequent pattern search areas from the history data DB 261, and calculates the approval ratings of all the selected search areas.

Here, when $K_i$ is the floating population of each area, the approval rating (support) of census output area m is calculated using the following Equation 1:

$$\text{Support}_m = \frac{K_m}{\sum K_i} \quad (1)$$

Figure 9:
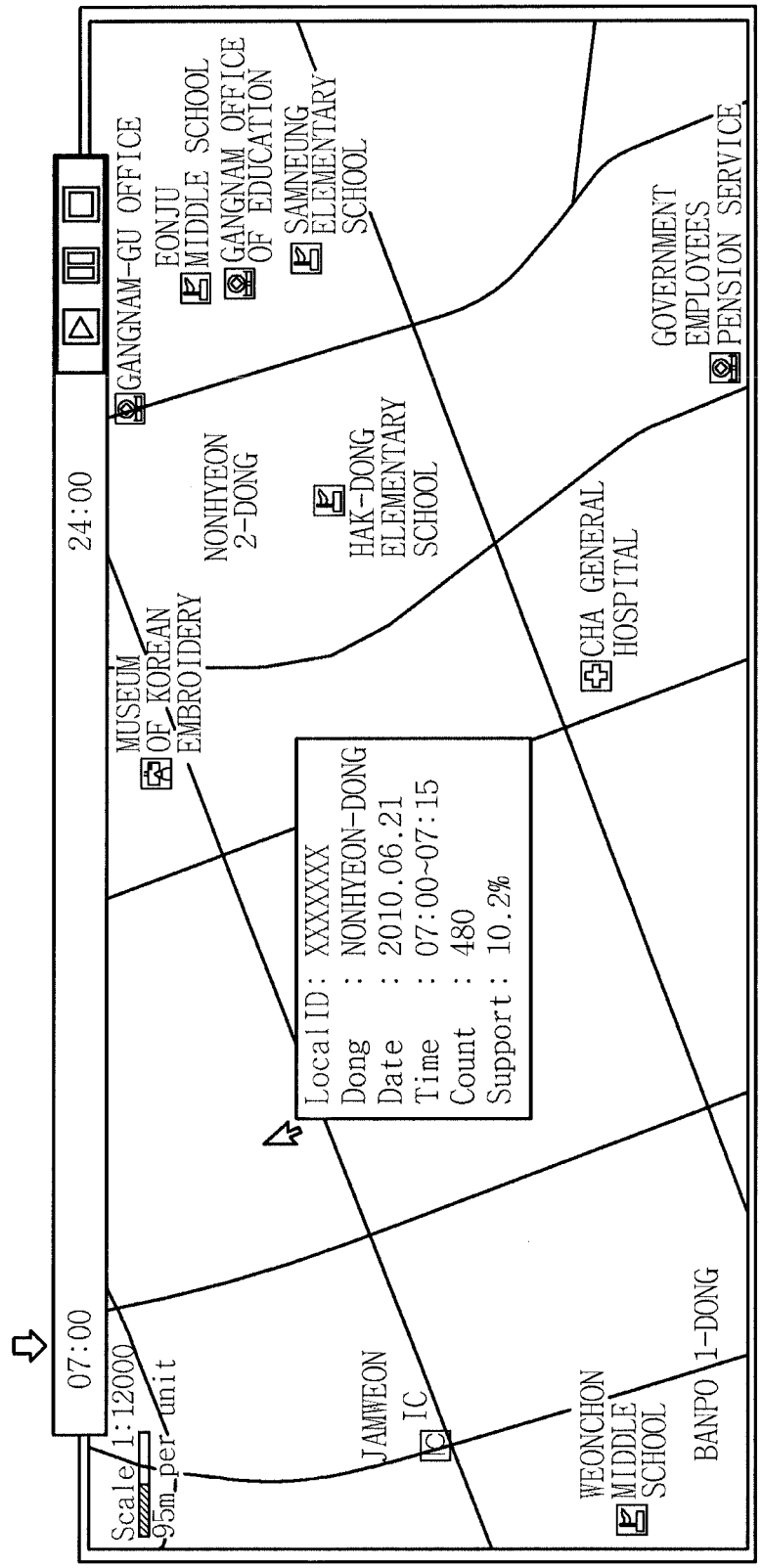

FIG. 9 shows an example in which the results of frequent pattern searches obtained by the data mining analysis unit 250 of FIG. 8 are indicated on a digital map.

Here, the embodiment of FIG. 9 shows the results of area-based frequent pattern search, that is, areas in which floating population are concentrated, every 15 minutes.

As an example, the data mining analysis unit 250 sets attributes used to extract necessary data from the entire floating population data (for example, the total number of census output areas selected by the system user is set to 50, the approval rating (support) input by the system user is set to 5%, the entire time interval is the previous day, and each time section for animation is set to 15 minutes).

Here, the data mining analysis unit 250 calculates the approval rating (support) for all the floating population of selected census output areas every 15 minutes, and indicates only areas each having the approval rating (support) equal to or greater than 5% on a map.

Thereafter, the data mining analysis unit 250 indicates the approval rating (support) of the time-varying floating population using animation in the form of explanatory remarks.

Figure 10:
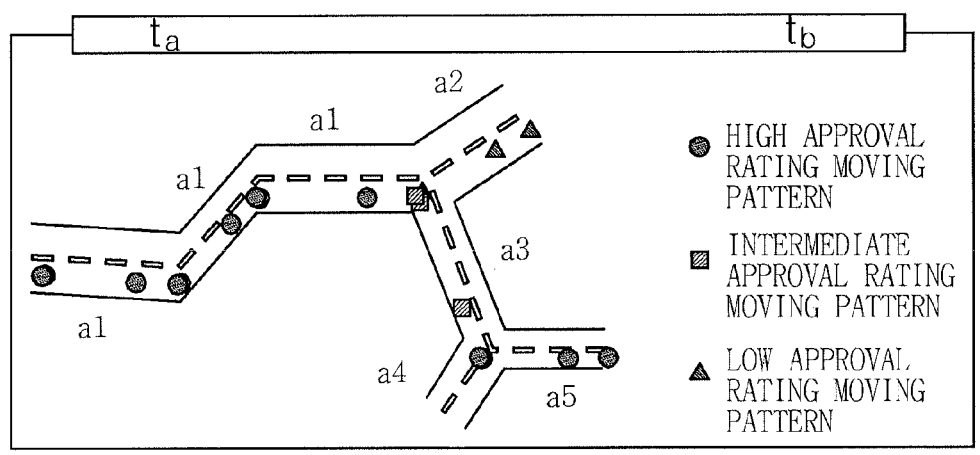

FIG. 10 shows an example in which the results of the sequential pattern search obtained by the data mining analysis unit 250 are indicated on a digital map.

Here, the embodiment of FIG. 10 shows both the directionality and frequency of the is flows of floating population on a digital map using animation functionality.

As an example, the data mining analysis unit 250 uses floating information related to the users of mobile communication terminals, who are males in their twenties and who have slightly high levels of living, as the data for sequential pattern searches.

Furthermore, the data mining analysis unit 250 sets the time interval of the sequential pattern searches for 15 minute (animation time section)-based sequential patterns within the previous day.

From FIG. 10, it can be seen that moving patterns each having a high approval rating are indicated in 'a1' and 'a5', a moving pattern having an intermediate approval rating is indicated in 'a3', and a moving pattern having a low approval rating is indicated in 'a2'.

Figure 11:
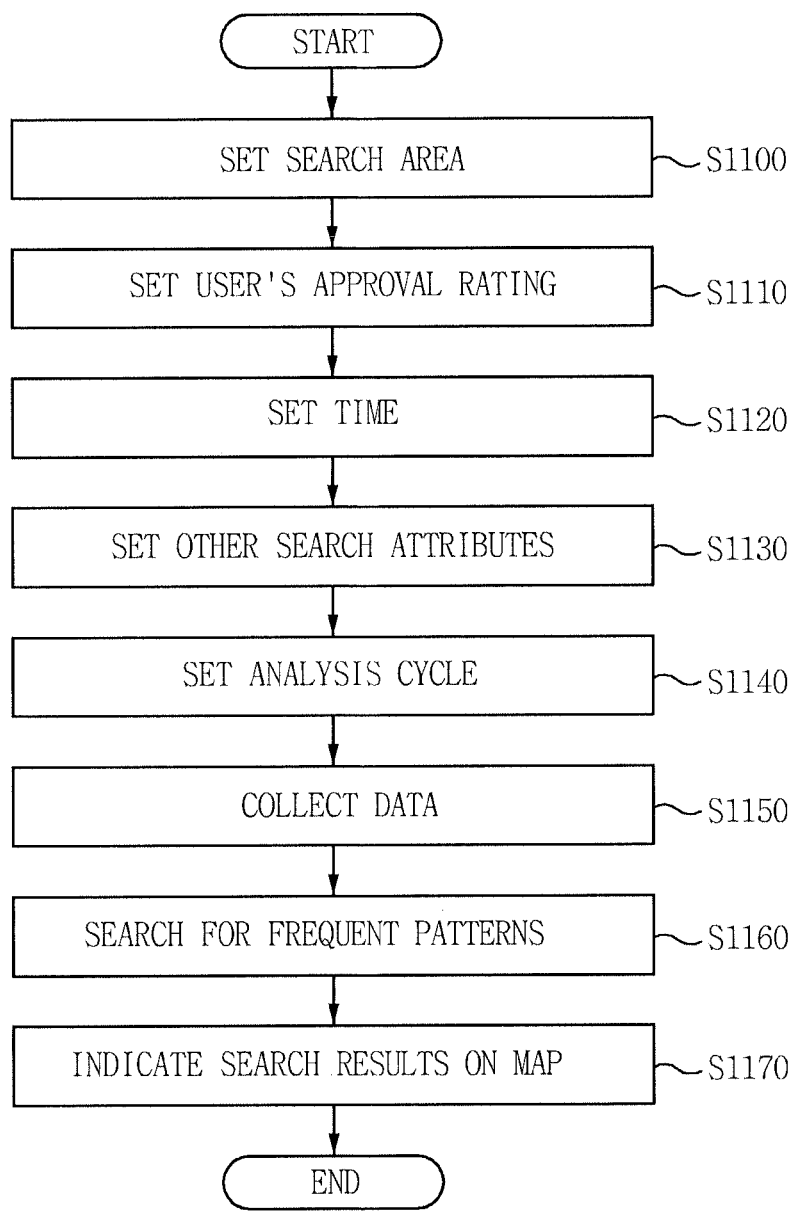
FIGS. 11 and 12 are flowcharts showing the flow of a method of analyzing floating population information according to the present invention.
Figure 12:
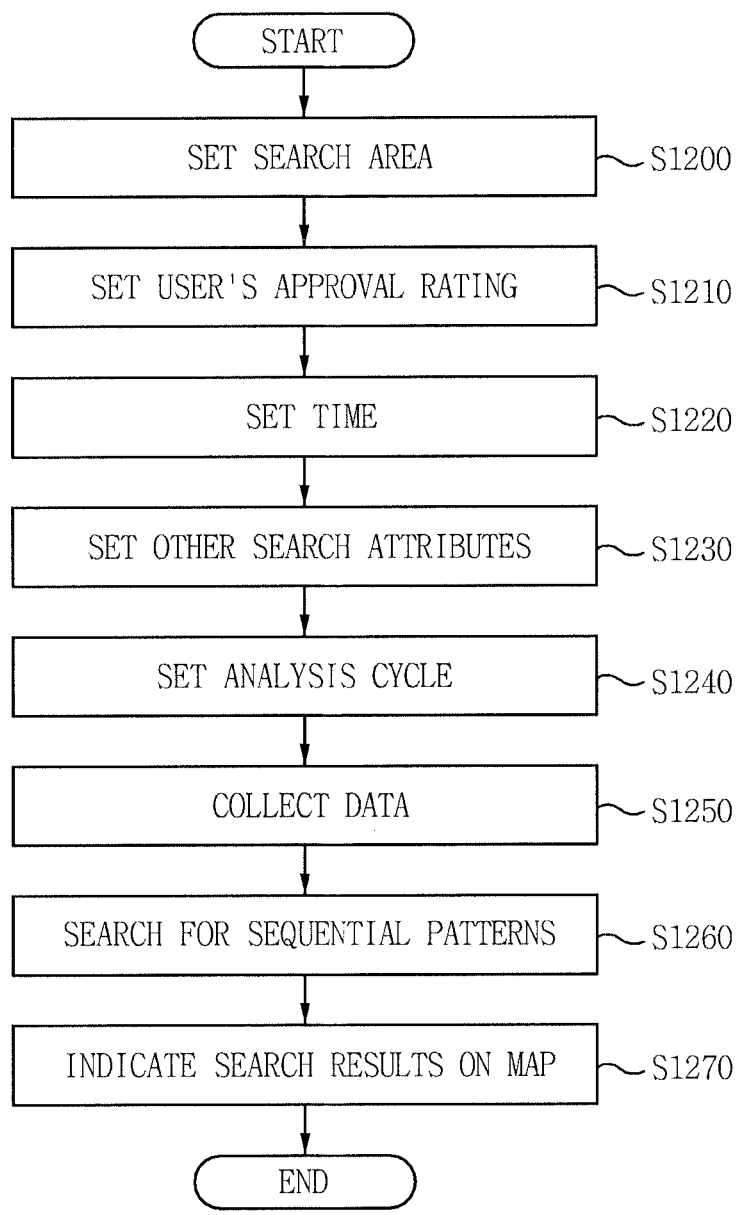

FIGS. 11 and 12 are flowcharts showing the flow of a method of analyzing information about floating population according to the present invention.

First, FIG. 11 is a flowchart showing the flow of a frequent pattern search process.

As shown in FIG. 11, the frequent pattern search module 251 sets a search area for area-based frequent pattern search at step S1100. That is, at step S1100, the frequent pattern search module 251 sets a search area on a map.

Furthermore, the frequent pattern search module 251 sets a system user's threshold value, such as a system user's approval rating, at step S1110, and sets the entire time interval and time sections for animation at step S1120.

Additionally, the frequent pattern search module 251 sets search attributes used to extract only necessary data from the entire floating population data at step S1130, and sets an analysis cycle to report search results at step S1140.

Thereafter, the frequent pattern search module 251 collects data, corresponding to the frequent pattern search area set at step S1100, from the history data DB 261 at step S1150, and calculates the approval ratings of all search areas selected from the collected data, and searches for area-based frequent patterns at step S1160.

Here, the frequent pattern search module 251 calculates the approval rating of census output area m within a predetermined time interval using Equation 1 when $K_i$ is the floating population of each area.

Finally, the frequent pattern search module 251 indicates frequent pattern search results, obtained at step S1160, on a digital map at step S1170.

Meanwhile, FIG. 12 is a flowchart showing the flow of a sequential pattern search process.

As shown in FIG. 12, the sequential pattern search module 255 sets a search area used to perform road-based sequential pattern search at step S1200. That is, at step S1200, the sequential pattern search module 255 sets a search area on a map.

Furthermore, the sequential pattern search module 255 sets a system user's threshold value, such as a system user's approval rating, at step S1210, and sets the entire time interval and time sections for animation at step S1220.

Additionally, the sequential pattern search module 255 sets search attributes used to extract only necessary data from the entire floating population data at step S1230, and sets an analysis cycle to report search results at step S1240.

Thereafter, the sequential pattern search module 255 collects data, corresponding to the sequential pattern search area set at step S1200, from the history data DB 261 at step S1250.

Here, the sequential pattern search module 255 divides the data, collected at step S1250, into the time sections for animation set at step S1220, and searches the time sections for sequential patterns at step S1260.

Finally, the sequential pattern search module 255 indicates sequential pattern search results, obtained at step S1260, on a digital map at step S1270.

The present invention is advantageous in that it collects and integrates information about the movements of the coordinates of mobile communication terminals over time and provides information about the characteristics and analysis of time-varying floating population on a digital map using a data mining analysis technique and a GIS, thereby enabling the reliable analysis of information about floating population.

Furthermore, the present invention is advantageous in that data about the movement of the users of mobile phones is collected, so that expenses incurred in the collection of information about floating population can be considerably reduced and so that floating population can be analyzed nationwide.

Moreover, the present invention is advantageous in that it can show the actual flows of floating population and variations in floating population over time in cooperation with a GIS, thereby enabling the analysis of commercial areas in light of floating population, such as the analysis of specific areas and search for marketing target areas which are used for road advertisements, roadside marketing and the distribution of leaflets.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for analyzing information about a floating population, comprising a processor configured to execute:
    an information collection unit for collecting information about locations provided by mobile communication terminal of each of moving objects, information about attributes of the moving objects registered in an external server, and information about locations and attributes related to stationary objects;
    a data integration unit for creating integrated data by integrating the information collected by the information collection unit, national statistical information of a geographic information system (GIS), and map data registered previously;

a data mining analysis unit for extracting data, consistent with conditions input by a system user, from the integrated data, and searching the map data for moving patterns of the moving objects using data mining analysis; and an interface unit for providing a map service in which search results, provided by the data mining analysis unit, have been applied to the map data.

2. The apparatus as set forth in claim 1, wherein the data mining analysis unit comprises a frequent pattern search module for searching areas, which belong to areas selected from the map data by the system user and each of which has the floating population equal to or larger than a reference value, for frequent patterns.

3. The apparatus as set forth in claim 2, wherein the frequent pattern search module searches for moving patterns each of which has a value equal to or greater than a predetermined percentage in respect of the conditions input by the system user.

4. The apparatus as set forth in claim 2, wherein the data mining analysis unit indicates areas having the floating population larger than a predetermined threshold on the map data based on the frequent patterns searched out by the frequent pattern search module.

5. The apparatus as set forth in claim 1, wherein the data mining analysis unit comprises a sequential pattern search module for searching for sequential patterns of specific paths which belong to paths of the moving objects occurring in a preset time interval and in preset time section and which have occurred a number of times greater than a threshold value.

6. The apparatus as set forth in claim 5, wherein the sequential pattern search module searches for the sequential patterns from road Identifiers (IDs) included in information about movement of the mobile communication terminals of the moving objects.

7. The apparatus as set forth in claim 6, wherein the sequential pattern search module searches for the moving patterns by connecting locations of the road IDs, included in the information about movement of the mobile communication terminals of the moving objects, in time order when the moving objects move.

8. The apparatus as set forth in claim 5, wherein the data mining analysis unit indicates time-varying moving patterns, occurring on roads, on the map data based on the sequential patterns searched out by the sequential pattern search module.

9. The apparatus as set forth in claim 1, wherein the information collection unit collects at least one of information which is selected from among information about movement and attributes of the mobile communication terminals of the moving objects, information about ages, genders, residences, levels of living, use of membership cards, payment using credit cards and use of transportation cards of users of the mobile communication terminals, and national statistical information.

10. The apparatus as set forth in claim 1, wherein the information collection unit periodically or non-periodically collects the information about locations provided by the mobile communication terminals of the moving objects.

11. The apparatus as set forth in claim 1, further comprising a storage unit for storing the map data, the information collected by the information collection unit, and the integrated data created by integrating the map data with the information collected by the information collection unit.

12. A method of analyzing information about floating population, comprising:

collecting information about locations provided by mobile communication terminals of each of moving objects, information about attributes of the moving objects registered in an external server, and information about locations and attributes related to stationary objects;

creating integrated data by integrating the information collected by the collecting, national statistical information of a GIS, and map data registered previously;

extracting data, consistent with conditions input by a system user, from the integrated data, and searching the map data for moving patterns of the moving objects using data mining analysis; and providing a map service in which search results of the searching for the moving patterns have been applied to the map data.

13. The method as set forth in claim 12, wherein the collecting collects at least one of information which is selected from among information about movement and attributes of the mobile communication terminals of the moving objects, information about ages, genders, residences, levels of living, use of membership cards, payment using credit cards and use of transportation cards of users of the mobile communication terminals, and national statistical information.

14. The method as set forth in claim 13, wherein the searching for the moving patterns comprises searching areas, which belong to areas selected from the map data by the system user and each of which has the floating population equal to or larger than a reference value, for frequent patterns using a frequent pattern search module.

15. The method as set forth in claim 14, wherein the searching for the frequent patterns searches for moving patterns each of which has a value equal to or greater than a predetermined percentage in respect of the conditions input by the system user.

16. The method as set forth in claim 14, wherein the searching for the moving patterns further comprises indicating areas which have the floating population larger than predetermined threshold on the map data based on the frequent patterns searched out by the frequent pattern search module.

17. The method as set forth in claim 13, wherein the searching for the moving patterns comprises searching for sequential patterns of specific paths, which belong to paths of the moving objects occurring in a preset time interval and in preset time section and which have occurred a number of times greater than a threshold value, using a sequential pattern search module.

18. The method as set forth in claim 17, wherein the searching for the sequential patterns searches for the sequential patterns from road IDs included in information about movement of the mobile communication terminals of the moving objects.

19. The method as set forth in claim 18, wherein the searching for the sequential patterns searches for the moving patterns by connecting locations of the road IDs, included in the information about movement of the mobile communication terminals of the moving objects, in time order when the moving objects move.

20. The method as set forth in claim 17, wherein the searching for the moving patterns further comprises indicating time-varying moving patterns, occurring on roads, on the map data based on the sequential patterns searched out by the sequential pattern search module.

* * * * *